Oct. 24, 1950

X. F. CASTELLI 2,527,397

ADJUSTING DEVICE FOR THE TRANSVERSE MOVEMENTS
OF A PARALLEL LATHE TOOL, MORE PARTICULARLY
FOR THREAD-CUTTING

Filed June 14, 1945

Inventor:
Xavier Francois Castelli,
By his attorneys,
Baldwin, Wight, & Prevost

Oct. 24, 1950     X. F. CASTELLI     2,527,397
ADJUSTING DEVICE FOR THE TRANSVERSE MOVEMENTS
OF A PARALLEL LATHE TOOL, MORE PARTICULARLY
FOR THREAD-CUTTING

Filed June 14, 1945     2 Sheets-Sheet 2

INVENTOR.
Xavier F. Castelli
By Baldwin & Wight
his ATTORNEYS.

Patented Oct. 24, 1950

2,527,397

UNITED STATES PATENT OFFICE 2,527,397

ADJUSTING DEVICE FOR THE TRANSVERSE MOVEMENTS OF A PARALLEL LATHE TOOL, MORE PARTICULARLY FOR THREAD CUTTING

Xavier François Castelli, Paris, France, assignor to Cri-Dan Societe a Responsabilite limitee, Paris, France, a corporation of France Application June 14, 1945, Serial No. 599,396
In France April 7, 1941

Section 1, Public Law 690, August 8, 1946
Patent expires April 7, 1961

6 Claims. (Cl. 10—101)

The present invention relates to a device for the adjustment of the transverse movements of a tool of a horizontal lathe, more particularly for thread cutting, in which the said tool is brought after each cut to a greater depth of cut by a cam having an increasing profile and thrown into gear, by a driving shaft rotating by one turn for every operation, with a ratchet wheel the pawl of which is rendered inactive after the last cutting or other operation by a stop co-axial with the ratchet wheel and the cam.

An embodiment of my invention is shown by way of non-limitative example, in the appended drawings, in which.

In the said example, 1 represents a tool-holder in which is fastened a tool 2 adapted for acting on the piece 3 to be threaded, the said piece being mounted in the usual manner on the spindle of the lathe (not shown). The tool-holder 1 is secured on a tool-carriage similar to the cross-slide of an ordinary horizontal lathe and which, for this reason, is neither shown nor described. The said carriage or slide is mounted so as to be capable of being disposed at any desired inclination according to the angle of the thread to be cut in order eventually to make it possible for the tool to run longitudinally instead of screw-cutting. The only peculiarity of said cross-slide is that instead of being acted upon by a screw in the usual manner it is submitted, according to the invention, to the action of a spring the tension of which is adjustable, the said spring being diagrammatically shown at 4 and constantly tending to push the slide in the direction opposed to the cut.

Figure 1:
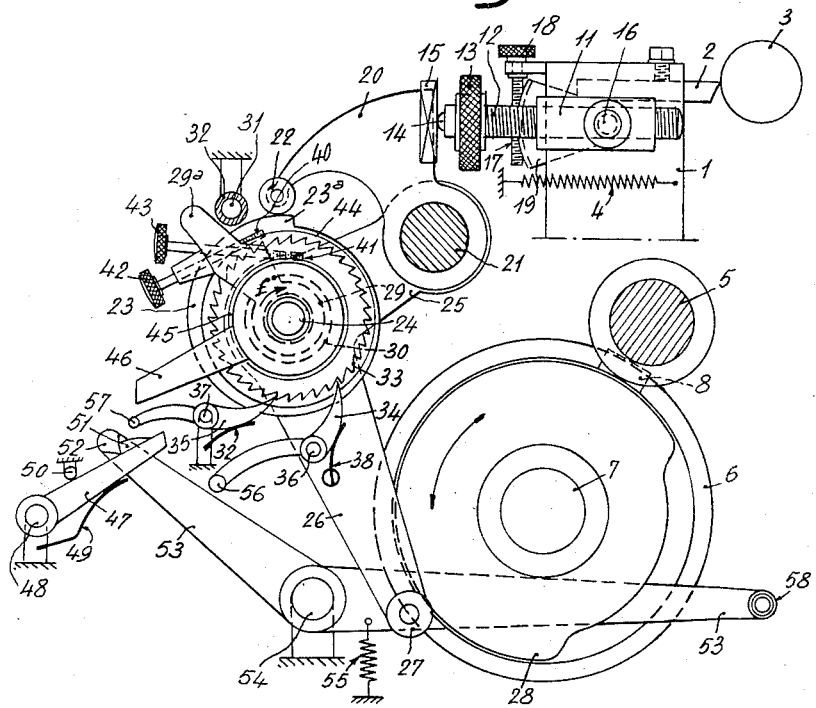
Figure 1 is a view primarily in elevation but partly in section of the whole device.
Figure 2:
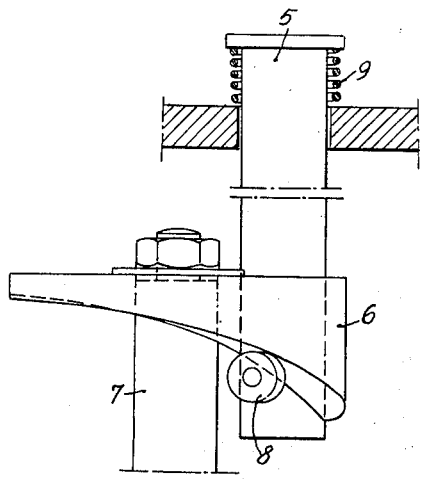
Figure 2 is a plan detail view of the device controlling the longitudinal displacements of the tool.

The cross-slide is mounted on a master-carriage the longitudinal displacement of which, parallel to the axis of the piece 3 to be threaded, is controlled, for instance, by a shaft 5 fast with it and receiving an axial movement under the action of a cam 6 mounted on a shaft 7 (Figures 1 and 2). The said movement is transmitted by the cam 6 to the shaft 5 by means of a roller 8 fastened on one end of the latter and bearing on the profile of the cam under the action of a compression spring 9 acting on the other end of the shaft 5. The profile of the cam 6 comprises, for instance: at an angle of about 270° a helical part corresponding to the work of the tool; at an angle of about 15° a dwell producing a stop of the carriage during which the tool is released; at an angle of about 60° a helical part, the inclination of which is contrary to that of the former, and corresponding to the return of the carriage under the action of spring 9, and at an angle of about 15° a second dwell producing another stop of the carriage during which the tool 2 feeds according to the value of the following cut. The shaft 7 carrying the cam 6 is rotated from the spindle of the lathe through the medium of a gear (not shown) making it possible to obtain the ratio which should exist between the speed of the spindle and that of the shaft 7 in function of the pitch of the thread and the dimensions of the cam and, furthermore, to obtain, at will, right-handed or left-handed thread pitches.

Figure 3:
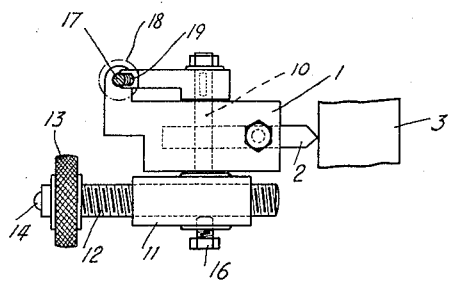
Figure 3 is a plan detail view of the device for adjusting the point of contact of the tool-holder with the rocking plate controlling the transverse displacements of the tool.

On the tool-holder 1 there is mounted by means of a shaft 10 a piece 11 which receives a threaded rod 12 parallel to the tool 2 and provided with a knurled adjusting collar 13. The said rod carries at its end a knob 14 of ebonite, for instance, bearing through contraction of the spring 4, against a plate 15 disposed parallel to the axis of the piece 3 to be threaded. The threaded rod 12 can be locked in the piece 11 after adjustment by means of a set screw 16. Furthermore, the position of the knob 14 can allow a complementary adjustment through rocking about the axis 10 by means of a worm 17 provided with a knurled button 18 and tangentially engaging a sector 19 secured on the axis 10 (Figures 1 and 3). It is thus possible to adjust with a very great precision the position of the point of contact of the knob 14 with the plate 15 and, accordingly, this determines the transverse adjustment of the tool. The plate 15 on which the knob 14 rests is fast with an arm 20 capable of rocking about the axis of pivot 21 and carries on the side opposite to the plate 15, a roller 22 resting on a peripheral profile cam 23 which rotates on the axis of a shaft 24 suitably fixedly mounted on the frame of the lathe or machine. The pivot 21 is carried by and moves with arm 25 which is fast to the shaft 24. On the other hand, a lever 26 carries at its end a roller 27 resting under the thrusting action of the spring 4 (which acts on this unit through the medium of the carriage of the tool-holder 1 and of the threaded rod 12) on a peripheral profile cam 28 keyed on shaft 7. Arm or support 25 is integral with the arm or lever 26. The profile of the cam 28 is such that the latter permits the plate 15 and, accordingly, the toolholder 1 to move back under the action of the spring 4 for each revolution of the said cam at the moment when the carriage has reached the end of its working stroke by a sufficient quantity and during a sufficient time for making possible the release of the tool 2 and its return movement.

Figure 4:
Figure 4 is a diagrammatical view showing an example of the outline of the cam controlling the rocking plate.

The peripheral profile cam 23 rotating on the axis of shaft 24 is intended for controlling the feeding movement of the tool 2 for each cut and for determining the number of cuts. The profile of the said cam is established so that while the overall depth of cut is increased with each cut, the depth of each successive cut is less than the prior cut irrespectively of the number of the said cuts. The said profile is thus formed by a curve the radius of which progressively decreases from the point 23a so that the difference of height between the ends of a sector of a predetermined length taken on the said profile varies according to the position of the said sector on the periphery of the cam. Fig. 4 is a diagrammatical view showing an example of the outline of the cam 23 and the different depths of the threads obtained, for instance, in six cuts, according to the circumferential position of the roller 22 on the said cam, the said position being capable of being adjusted by means of the mechanism which will be described later on, which makes it possible to obtain any other intermediary position. As to the number of cuts, it depends on the amplitude of the sector of the cam 23 which is brought to act upon the roller 22, the said amplitude being also capable of adjustment by means of the mechanism which will be described later on, which offers the possibility of obtaining a large number of combinations.

Figure 5:
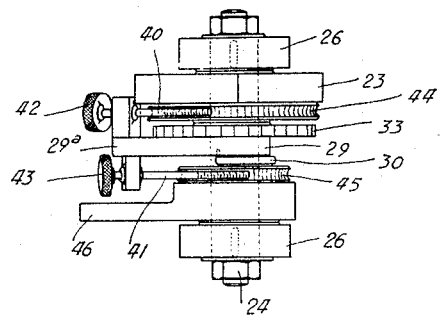
Figure 5 is a plan view of the adjusting devices for the cam and for the index-arm controlling the stopping of the machine.

The adjusting and control mechanism of cam 23 comprises (Figs. 1 and 5) a ring 29 rotatably mounted on shaft 24 by the side of the cam 23 and so as to swing with precision on the said axis. The said ring 29 is submitted to the action of a spiral spring 30 tending to carry it along in the direction of the arrow f and carries a finger 29a which cooperates with a stop 31 surrounded, for instance, with a lining of elastic material 32 intended for limiting the angular displacement of the ring 29 when the latter is moved by the spring 30. On the other hand, the ring 29 is fast with a rachet wheel 33 with which coact two pawls 34 and 35, pawl 34 being carried by the arm 26 and pawl 35 being mounted on a fixed axis 37, and submitted to the action of springs 38, 39 respectively. Finally, the ring 29 forms a framework for two worms 40 and 41 provided with adjusting buttons 42 and 43 respectively and tangentially engaging one a toothed wheel 44 fast with cam 23 and the other a toothed wheel 45 fast with a piece 46 forming an index-arm also rotatably mounted on the axis 24 and located on the side of the ring 29 opposed to that where the cam 23 is located. The worm 40 makes it possible to adjust the angular position of the cam 23 with respect to the finger 29a and, accordingly, with respect to the stop 31, while the worm 41 makes it possible to adjust the angular position of the index-arm 46 with respect to the finger; this double adjustment determines, as will be better understood later on, the active part of the cam 23, thus determining the depth of the obtained thread and it fixes the number of cuts of the tool. Furthermore, the two worms 40 and 41 make the cam 23 and the index-arm 46 fast with the ring 29 and, accordingly, with the ratchet wheel 33.

In the path of travel of the index-arm 46 is mounted a lever 47 rocking about a fixed axis 48 and normally urged by a spring 49 against a stop 50. The said lever 47 carries a nose 51 interhooking with a nose 52 provided on a two-armed lever 53 pivotally mounted on an axis 54 and submitted to the action of a spring 55. The double-armed lever 53 is placed so as to act, during its angular displacement about the axis 54, on fingers 56 and 57 fast with pawls 34 and 35 respectively so as to release the latter from the ratchet wheel 33; on the other hand, the said lever controls through the medium of a transmission, not shown, the declutching mechanism of the machine. At the end of the lever 53 opposed to nose 52 is provided a handle 58 making it possible to control by hand the said lever for starting the machine again.

The whole thus constituted device works as follows:

At the beginning of a threading operation, the finger 29a rests against the stop 31. The device having been started, the cam 6 acts on roller 8 of the shaft 5 and causes the tool holder 1 to move in a path parallel to the axis of the piece 3 to be threaded, that is, longitudinally of the machine or on a threading stroke. At the end of the threading stroke, the roller 8 will be on a dwell portion of the cam 6 and will stop the longitudinal movement of the tool holder 1 and the cam 28 acting on the roller 27 allows the arm 26 to swing counterclockwise about the axis of shaft 24 whereupon the tool holder moves back transversely of said path under urgency of the spring 4, carrying the tool 2 and thereby releasing it from the piece 3. At the same time the arm 26 in moving counterclockwise in following the contour of cam 28 under the action of spring 4, advances the pawl 34 which rotates the ratchet wheel 33 counterclockwise also and causes the whole mechanism fast with the piece 29 to rotate about the axis of shaft 24 to the extent of one tooth of the ratchet-wheel 33. With the cam 6 continuing to rotate, the tool holder 1 is caused by the spring 9 to move parallel to the axis of the piece 3, in the direction opposite to that of a threading stroke. When the rise in cam 28 moves the lever 26 clockwise, the pawl 35 prevents the ratchet from moving clockwise, the pawl 34 idly tripping over the ratchet teeth, the lever 26 therefore rotates with respect to the ratchet wheel 33 which relatively advances this wheel and the cam 23 connected thereto with respect to the lever and hence causes the tool to feed toward the work a greater distance than the previous feed movement. Thus, when the roller 8 is on the second dwell portion of the cam 6, the arm 26 is brought back to its starting point and the tool holder is brought back toward the piece 3, to the position for the following threading stroke. At the same time, the pawl 34 brought back by the arm 26 engages the following tooth of the ratchet wheel 33. During this movement the latter is held fast by the pawl 35 which is secured on the frame and against which the said wheel rests under the action of the spiral spring 30, which affords a resting position for the whole unit fast with the said ratchet wheel. On each revolution of the shaft 7 the said unit is, therefore, carried forward by the value of one tooth of the ratchet wheel 33 until the index-arm 46 can strike against the lever 47 and cause the latter to rock about axis 48, thus releasing the nose 51 from the nose 52 of the double-armed lever 53. The latter rocks under the action of the spring 55 about the axis 54, disconnects the machine drive and stops the various movements. Simultaneously, it acts upon the fingers 56 and 57 fast with the pawls 34, 35, thus releasing the latter from the ratchet wheel 33 and setting the latter free so that the whole mechanism mounted on the axis 24 is carried by the spiral spring 30 until the finger 29a is stopped by the stop 31. Thus, the pawls remain released until the lever 53 is brought again to its position by means of the handle 58. The machine is then started again and the operation begins anew on the new work mounted in place of the threaded piece 3.

As may be understood from the preceding explanations, the position given to the index-arm 46 with respect to the finger 29a by turning the worm 41 makes it possible to adjust, at will, the number of successive teeth of the wheel 33 which will be pushed by pawl 34 before the releasing which is produced by the pressure of the index-arm 46 upon the lever 47, takes place. This number of teeth corresponds to the number of cuts made by the tool before the machine is stopped, that is to say before the piece is finished. Thus, the said device makes it possible to vary, unit by unit, the number of cuts from an unchanging starting point constituted by stop 31 to a variable point corresponding to the adjustable meeting of the index-arm 46 with the lever 47. On the other hand, the position given to the cam 23 with respect to the stop 31 by turning of the worm 40 determines the part of the profile of the said cam which must act upon roller 22 and, accordingly, controls the depth of feed movement of the tool 2. The profile adopted for the cam 23 being given, the depth of the said movement can vary, therefore, for one and the same number of cuts, according to the position chosen for the said cam. The so devised double adjustment can easily be effected in such a manner that combinations are obtained which will meet all the practical requirements of the art.

In the described example above, it has been assumed that the plane face of the plate 15 with which the knob 14 comes into contact is strictly parallel with the axis of the piece 3 to be threaded. The said face might also be arranged so that it makes a predetermined angle with the axis of the piece 3 in case a conical thread were to be made.

I claim:

1. In a thread cuting mechanism for a lathe, a tool holder reciprocable to impart threading strokes to the tool and also movable transversely with respect to the path of said strokes to withdraw the tool from the work, a rotary increasing profile cam, means controlled by the cam and in turn controlling the transverse motion of said tool holder, means to rotate said cam from the lathe through a fraction of revolution after each threading stroke to advance said first-mentioned means, means for adjusting the angular starting position of said cam about its axis of rotation, a member movable angularly about the said axis, means to fasten said member to said cam and to adjust the angular position of said member with respect to said cam, means arranged in the path of travel of and operable by said member to displace the first-mentioned means so that the tool holder may move transversely away from the work, and biasing means disposing said cam in its angular starting position when said first-mentioned means has been displaced.

2. In a thread cutting mechanism for a lathe, a tool holder reciprocable to impart threading strokes to the tool and also movable transversely with respect to the path of said strokes to withdraw the tool from the work, a rotary increasing profile cam, means controlled by the cam and in turn controlling the transverse motion of said tool holder, means to rotate said cam from the lathe through a friction of revolution after each threading stroke to advance said first-mentioned means, a pair of members movable angularly about the axis of rotation of said cam, means to fasten said members to said cam and to adjust the angular positions of said members with respect to said cam independently of one another, means arranged in the path of travel of and operable by one of said members to displace the first-mentioned means so that the tool holder may move transversely away from the work, a fixed stop arranged in the path of travel of the other of said members, and biasing means to dispose said other member against said fixed stop when said first-mentioned means have been rendered inoperative.

3. In a thread cutting mechanism for a lathe, a tool holder reciprocable to impart threading strokes to the tool and also movable transversely with respect to the path of said strokes to withdraw the tool from the work, a rotary increasing profile cam, means controlled by the cam and in turn controlling the transverse motion of said tool holder, a ratchet wheel mounted coaxially with said cam, means to fasten said ratchet wheel to said cam, a pair of pawls engaging said ratchet wheel to rotate said ratchet wheel through a fraction of a revolution after each threading stroke and to stop said ratchet wheel during each threading stroke, a pair of members movable angularly about the axis of rotation of said cam, means to fasten said members to said cam and to adjust the angular positions of said members with respect to said cam independently of one another, means arranged in the path of travel of and operable by one of said members to displace the first-mentioned means so that the tool holder may move transversely away from the work, a fixed stop arranged in the path of travel of the other of said members, and biasing means to dispose said other member against fixed stop when said first-mentioned means have been rendered inoperative.

4. In a thread cutting mechanism for a lathe, a tool holder reciprocable to impart threading strokes to the tool and also movable transversely with respect to the path of said strokes to withdraw the tool from the work, a rotary increasing profile cam, means controlled by the cam and in turn controlling the transverse motion of said tool holder, a ratchet wheel mounted coaxially with said cam, means to fasten said ratchet wheel to said cam, a pair of pawls engaging said ratchet wheel to rotate said ratchet wheel through a fraction of a revolution after each threading stroke and to stop said ratchet wheel during each threading stroke, a member rigidly connected to said ratchet wheel, a second member movable angularly about the axis of rotation of said cam, means to fasten said second member to said ratchet wheel and to adjust the angular position of said second member with respect to said ratchet wheel, means arranged in the path of travel and operable by said second member to disengage said pawls from said ratchet wheel, a fixed stop arranged in the path of travel of said first-mentioned member, and biasing means to dispose said first-mentioned member against said fixed stop when said pawls have been disengaged from said ratchet wheel.

5. In a thread cutting mechanism for a lathe, a tool holder reciprocable to impart threading strokes to the tool and also movable transversely with respect to the path of said strokes to withdraw the tool from the work, a rotary increasing profile cam, means controlled by the cam and in turn controlling the transverse motion of said tool holder, a ratchet wheel mounted coaxially with said cam, a supporting ring fastened coaxially on said ratchet wheel and having an arm extending radially therefrom, a member movable angularly about the axis of rotation of said cam and having an arm extending radially from said cam, a pair of toothed wheels mounted coaxially with said cam and respectively fastened to said cam and to said member, a pair of worms mounted on said supporting ring engaging tangentially respectively with said toothed wheels for adjusting the angular positions of said cam and of said member with respect to said supporting ring independently of one another, a pair of pawls engaging said ratchet wheel to rotate said ratchet wheel through a fraction of a revolution after each threading stroke and to stop said ratchet wheel during each threading stroke, means arranged in the path of travel of and operable by said second-mentioned arm for disengaging said pawls from said ratchet-wheel, a fixed stop arranged in the path of travel of said first-mentioned arm, and biasing means to dispose said first-mentioned arm against said fixed stop when said pawls have been disengaged from said ratchet wheel.

6. In a thread cutting mechanism for a lathe, a tool-holder, a cam operated by said lathe, a lever pivotally mounted on an axis provided on the lathe frame, means biasing said lever to follow the contour of said cam, an increasing-profile cam journalled on the same axis as said lever, a movable device on said lever engaged by said increasing profile cam and in turn engaging and normally operatively positioning the tool-holder, a ratchet rotatably mounted on the same axis as the lever, said ratchet being operatively connected to said profile cam, a pawl on said lever coacting with said ratchet whereby said lever as it swings in one direction causes said pawl to advance said ratchet wheel and said increasing-profile cam about their axis, and thereby feed the tool-holder toward the work a greater distance than the previous feed movement.

XAVIER FRANÇOIS CASTELLI.

REFERENCES CITED

The following references are of record in the file of this patent:

UNITED STATES PATENTS

| Number | Name | Date |
|---|---|---|
| 1,444,433 | Smith | Feb. 6, 1923 |
| 1,761,243 | Townsend | June 3, 1930 |
| 2,005,332 | Asbridge | June 18, 1935 |
| 2,084,898 | Eckardt et al. | June 22, 1937 |
| 2,311,591 | Groene et al. | Feb. 16, 1943 |
| 2,322,127 | Groene | June 15, 1943 |
| 2,370,218 | Young | Feb. 27, 1945 |